(12) United States Patent
Hunt et al.

(10) Patent No.: US 9,990,102 B2
(45) Date of Patent: Jun. 5, 2018

(54) CREATING AND EDITING DIGITAL CONTENT WORKS

(71) Applicant: INKLING SYSTEMS, INC., San Francisco, CA (US)

(72) Inventors: Christopher Hunt, San Francisco, CA (US); Olof Alexander Mathé, San Francisco, CA (US); Chanpory Rith, San Francisco, CA (US)

(73) Assignee: INKLING SYSTEMS, INC., San Francisco, CA (US)

( * ) Notice: Subject to any disclaimer, the term of this patent is extended or adjusted under 35 U.S.C. 154(b) by 195 days.

(21) Appl. No.: 14/764,936

(22) PCT Filed: Feb. 11, 2014

(86) PCT No.: PCT/US2014/015818
§ 371 (c)(1),
(2) Date: Jul. 30, 2015

(87) PCT Pub. No.: WO2014/124443
PCT Pub. Date: Aug. 14, 2014

(65) Prior Publication Data
US 2016/0188155 A1    Jun. 30, 2016

Related U.S. Application Data

(60) Provisional application No. 61/763,362, filed on Feb. 11, 2013.

(51) Int. Cl.
*G06F 3/0482* (2013.01)
*G06F 3/0481* (2013.01)
(Continued)

(52) U.S. Cl.
CPC ........ *G06F 3/04812* (2013.01); *G06F 3/0482* (2013.01); *G06F 3/04817* (2013.01);
(Continued)

(58) Field of Classification Search
CPC ..... G06F 3/0481; G06F 3/0484; G06F 3/0482
See application file for complete search history.

(56) References Cited

U.S. PATENT DOCUMENTS 8,356,277 B1 * 1/2013 Bank ................... G06F 9/45529
717/111
9,098,291 B1 * 8/2015 Lin ........................... G06F 8/35
(Continued)

OTHER PUBLICATIONS

Dreamweaver 8 for Dummies (Oct. 2005).*
(Continued)

*Primary Examiner* — David Choi
(74) *Attorney, Agent, or Firm* — Ascenda Law Group, PC

(57) ABSTRACT

Icons representing a library of predefined media objects for insertion in a digital content work open for editing within a content creation and editing tool may be displayed in a graphical user interface of the content creation and editing tool. Thus, the content creation and editing tool may include an interface which displays, simultaneously, a presentation view and a code view of content comprising the digital content work along with icons representing the library of predefined media objects. Computer-readable code corresponding to a selected one of the library of predefined media objects may be inserted within the digital content work at a user-specified location, e.g., responsive to user action specifying a desire to insert code. Also, an explanation of a selected one of the media objects of the library may be displayed responsive to a user action.

18 Claims, 7 Drawing Sheets

(51) Int. Cl.
*G06F 17/24* (2006.01)
*G06F 3/0484* (2013.01)
*G06F 17/22* (2006.01)

(52) U.S. Cl.
CPC ...... *G06F 3/04842* (2013.01); *G06F 17/2247* (2013.01); *G06F 17/24* (2013.01)

(56) References Cited

U.S. PATENT DOCUMENTS

| | | | | |
|---|---|---|---|---|
| 2003/0110477 A1* | 6/2003 | Wakabayashi | .......... | G06F 11/28 717/135 |
| 2003/0132949 A1* | 7/2003 | Fallon | ....................... | G06F 1/28 715/700 |
| 2004/0199605 A1* | 10/2004 | Lacroix | ............... | G06F 17/3089 709/218 |
| 2005/0210123 A1* | 9/2005 | Wang | .................. | H04L 41/0253 709/218 |
| 2005/0257158 A1* | 11/2005 | Lombardo | .......... | G06F 17/2288 715/751 |
| 2009/0064103 A1* | 3/2009 | Shih | ..................... | G05B 19/056 717/113 |
| 2010/0269093 A1 | 10/2010 | Walsh | | |
| 2011/0047512 A1* | 2/2011 | Onogi | ................... | G06F 3/0482 715/836 |
| 2012/0210210 A1* | 8/2012 | Itoh | ....................... | G06F 17/212 715/236 |
| 2013/0132899 A1* | 5/2013 | Scott | .................. | G06F 3/03549 715/810 |
| 2014/0104266 A1* | 4/2014 | Stone | ..................... | G06F 17/50 345/419 |
| 2016/0188155 A1* | 6/2016 | Hunt | ...................... | G06F 17/24 715/808 |

OTHER PUBLICATIONS

International Preliminary Report on Patentability, issued by the International Preliminary Examining Authority (dated Dec. 18, 2015), for International Application No. PCT/US14/15818 (filed Feb. 11, 2014), 10 pgs.

International Search Report & Written Opinion, issued by the International Searching Authority (dated Jun. 27, 2014), for International Application No. PCT/US14/15818 (filed Feb. 11, 2014), 12 pgs.

\* cited by examiner

CREATING AND EDITING DIGITAL CONTENT WORKS

RELATED APPLICATIONS

This application is a U.S. National Stage Application based on International Application PCT/US2014/015818, filed Feb. 11, 2014, which is a NONPROVISIONAL of, claims priority to and incorporates by reference in it entirety, U.S. Provisional Application 61/763,362 filed Feb. 11, 2013.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Inkling Systems, Inc., All Rights Reserved.

FIELD OF THE INVENTION

The present invention is directed to systems and methods for creating and editing digital content works.

BACKGROUND

Development of traditional print media and other rich content (e.g., textbooks, travel books, magazines, cookbooks, how-to books, literature, and the like) involves many tasks, including managing the content creation and editing process. As print media have transitioned to electronic media, content creators and editors have been forced to either develop computer coding skills or rely on others with those skills.

SUMMARY

In various embodiments, creating and editing digital content works may include displaying, in a graphical user interface of a computer-based content creation and editing tool and responsive to user-input, icons representing a library of predefined media objects for insertion in a digital content work open for editing within the content creation and editing tool. The content creation and editing tool may include an interface which displays, simultaneously, a presentation view and a code view of content comprising the digital content work, along with icons representing the library of predefined media objects. Embodiments of the invention may further include inserting, within the digital content work at a user-specified location, computer-readable code corresponding to a selected one of the library of predefined media objects, e.g., responsive to user action specifying a desire to so insert the code. Such user action may be a cursor control action initiated when a cursor is positioned at the user-specified location in either of the presentation view or code view of the digital content work. Embodiments of the invention may further include displaying an explanation of a selected one of the media objects of the library, responsive to a user action positioning a cursor with respect to a respective one of the icons of the library. The explanation may be presented in a popup window and may be an example of the selected media object.

BRIEF DESCRIPTION OF THE DRAWINGS

The present invention is illustrated by way of example, and not limitation, in the figures of the accompanying drawings, in which:

FIG. 1 illustrates an example of an editing interface for creating, editing and publishing digital content works;

FIG. 2 illustrates an example of an editing interface for creating, editing and publishing digital content works that includes a pattern library button in accordance with an embodiment of the present invention;

FIG. 3 illustrates an example of the display of a pattern library panel or pane in the editing interface, resulting from selection of the pattern library button shown in FIG. 2;

DETAILED DESCRIPTION

Figure 4:
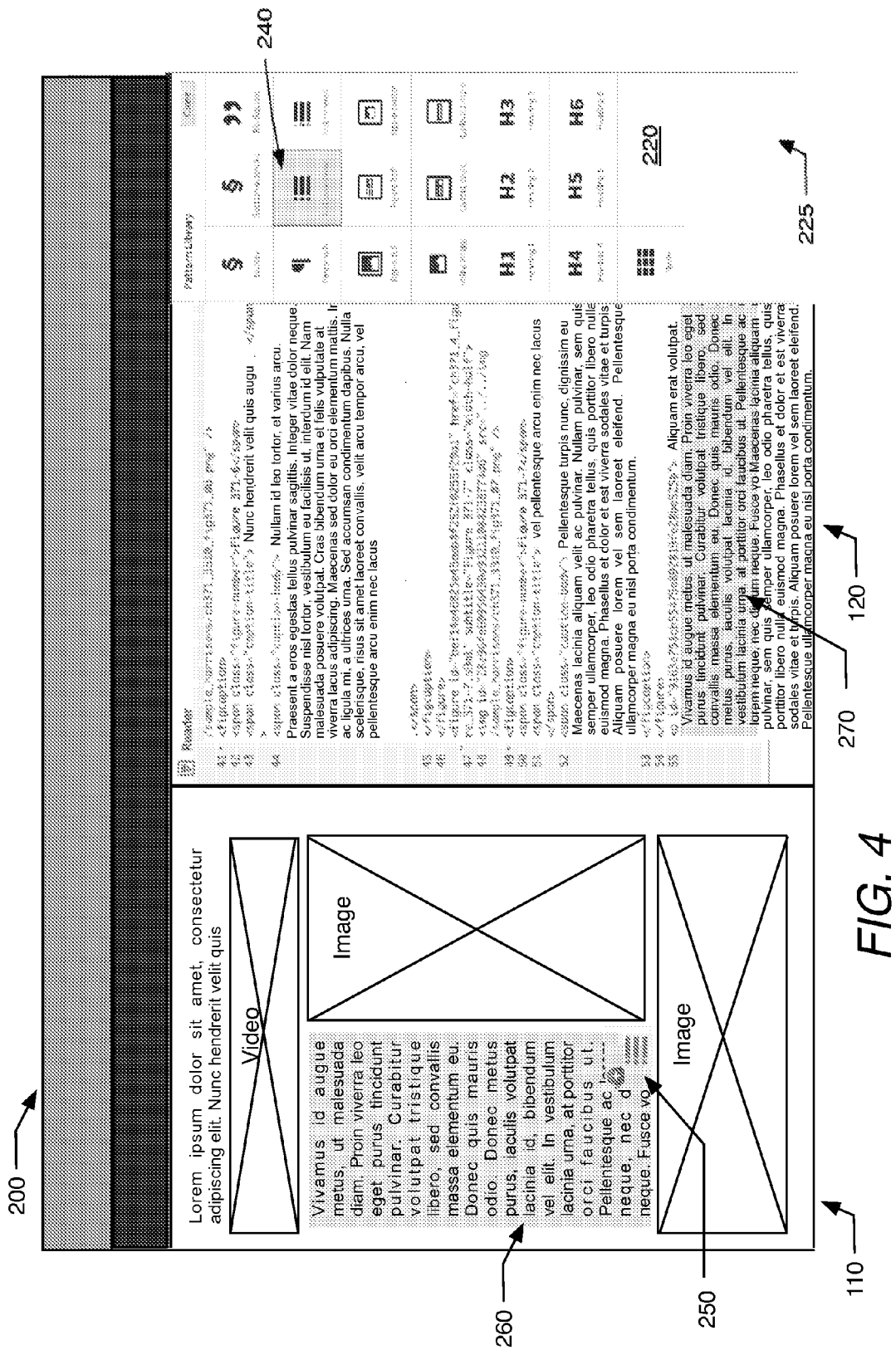
FIG. 4 illustrates user selection of a pattern library element and corresponding changes to a displayed cursor within the editing interface in accordance with an embodiment of the present invention.

Disclosed herein are systems and methods for creating and editing content items of digital content works. In particular, the present invention provides a graphical user interface with various options that provide users the ability to quickly review and insert predefined content items in context within new or existing digital content works as part of the content creation or editing process. These systems and methods thus permit users with no or limited knowledge of computer coding techniques or experience with markup languages a convenient way to assess, access and employ the content items as part of a content creation or editing process.

By "content items" we mean objects that may be formatted according to a variety of computer-readable or interpretable formats, as described more fully below. In some instances, content items may be instantiations of markup language objects, e.g., extensible markup language ("XML") objects, hypertext markup language ("HTML") objects, or the like, which can be inserted directly into containers such as "cards" or "media cards". These cards may be predefined templates for digital content works that include, among other things, one or more text sections, one or more image sections, image captions, and header sections, all arranged in a desired order. A collection of related cards may form a digital content work, for example an electronic book, magazine, article, etc., or a portion thereof, e.g., a section or chapter thereof, etc.

Figure 1:
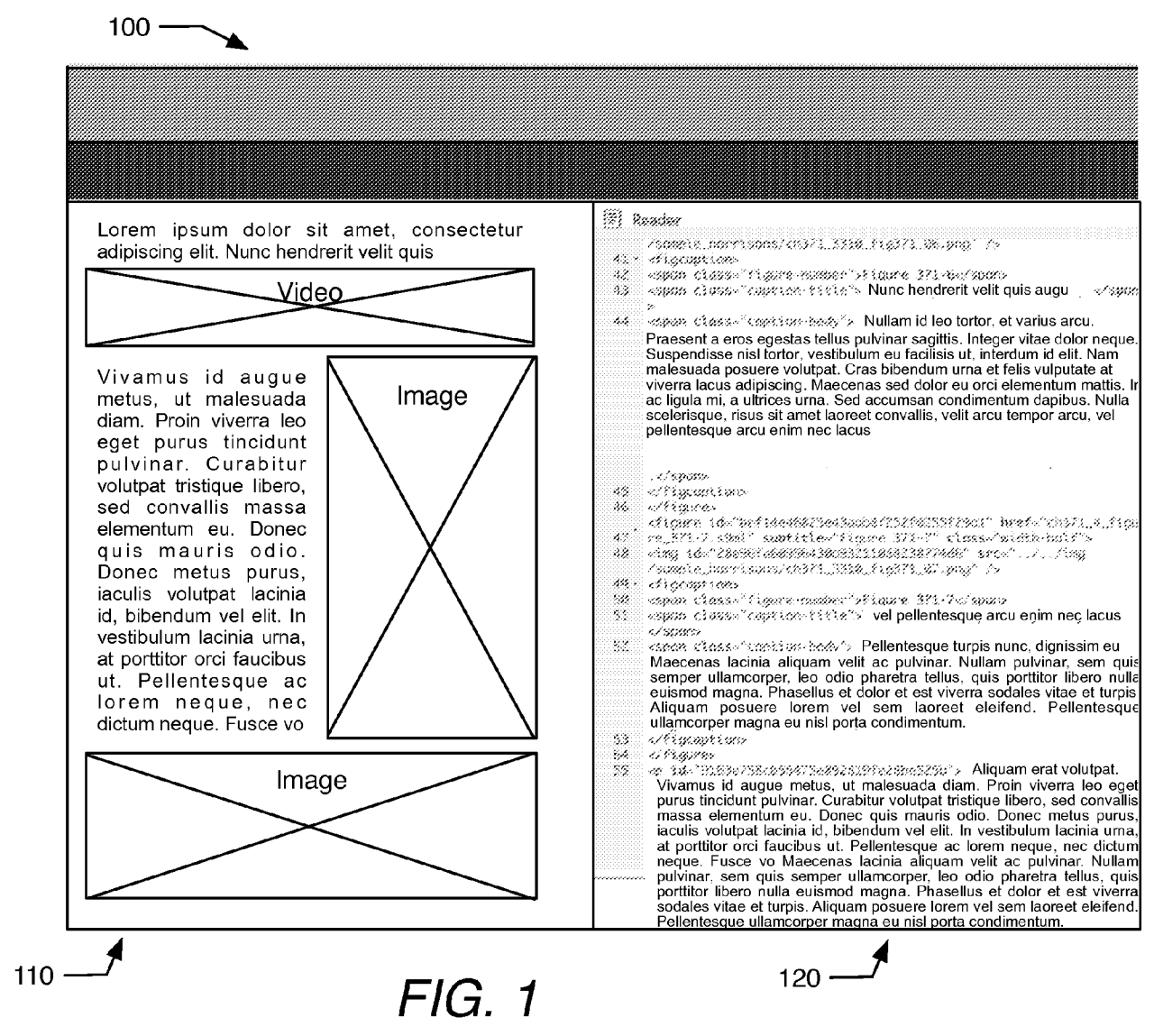

In U.S. patent application Ser. No. 13/711,583, filed 11 Dec. 2012, which application is assigned to the assignee of the present invention and incorporated herein by reference, systems and methods for creating, editing and publishing digital content works are described. Included in the system are WYSIWYG (What You See Is What You Get) editors of the kind illustrated in FIG. 1, which are editing interfaces 100 in which the content displayed on the screen during editing appears in a presentation panel 110 form closely corresponding to its appearance in a target rendering environment (e.g., a Web browser, reader application, mobile device web browser, etc.). The content viewing and editing tools are further configured to permit users to edit a digital content work by directly editing the source code thereof in a code panel 120. This may be referred to as "code mode" editing.

Within this editing tool, as edits are made to the source code in panel 120, the effect of those edits are rendered in real time in the representation of the digital content work shown in panel 110. This form of direct source code editing allows for editing at a very granular level. To assist the user in finding the exact spot which he/she wishes to edit, a focus mode is available: By clicking on an element in the presentation panel 110, a cursor will advance to the relevant position within the code in the code panel 120. Of course, some edits are best performed without code, so the WYSIWYG edit modes for objects such as image figures, slideshows and video elements are also available.

While useful for users that understand HTML code and are comfortable working directly on such code, interface 100 may not be suitable for users that have little or no familiarity with HTML code or coding. To address this issue, the present invention provides a predefined library of content elements (such as predefined HTML/CSS elements) that can be inserted directly into media cards that may or may not include existing content. The predefined objects may be system-supplied or customized by expert users. The library is accessible through a graphical user interface 200, examples of which are illustrated in FIGS. 2-5.

Figure 2:
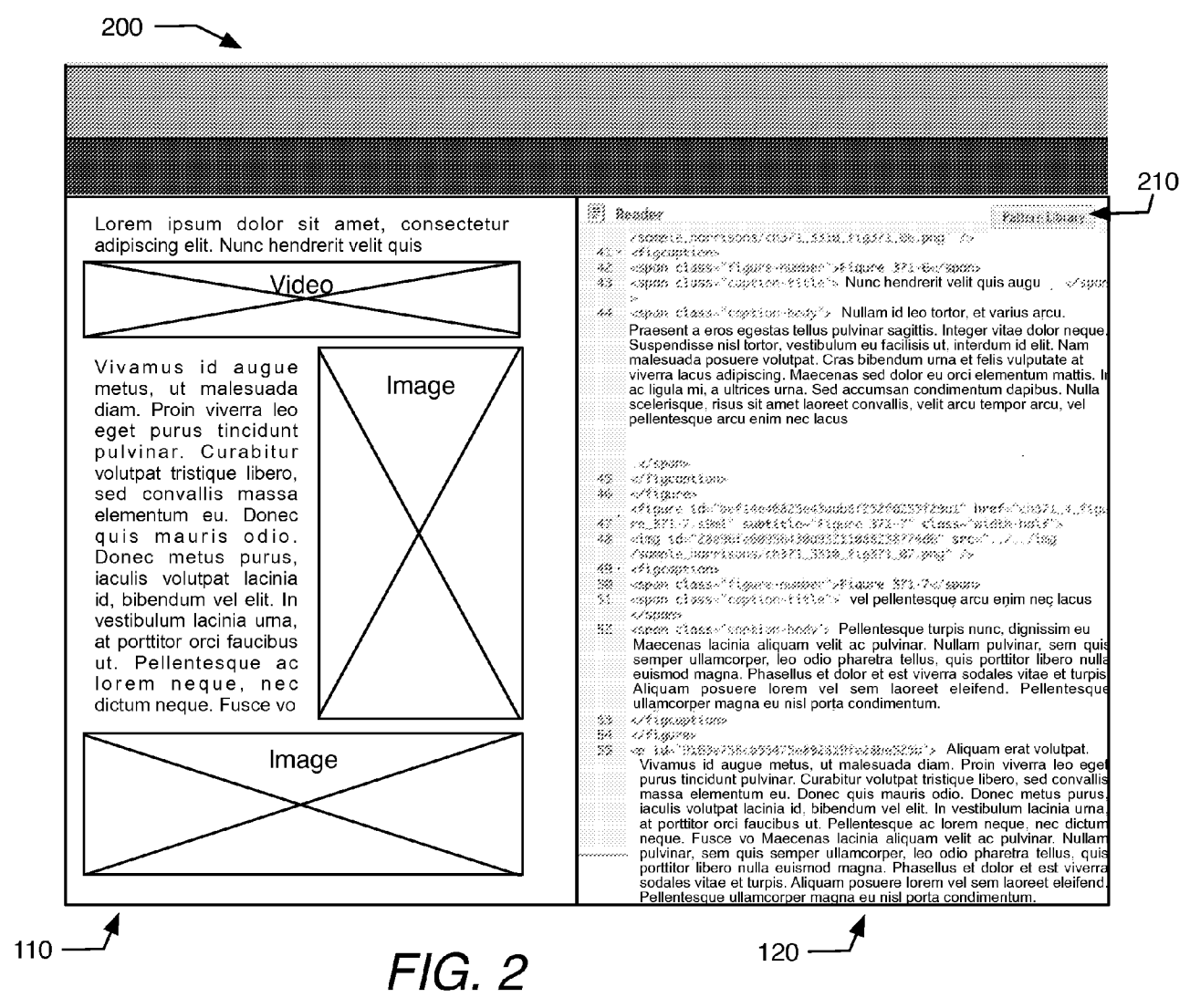
Figure 3:
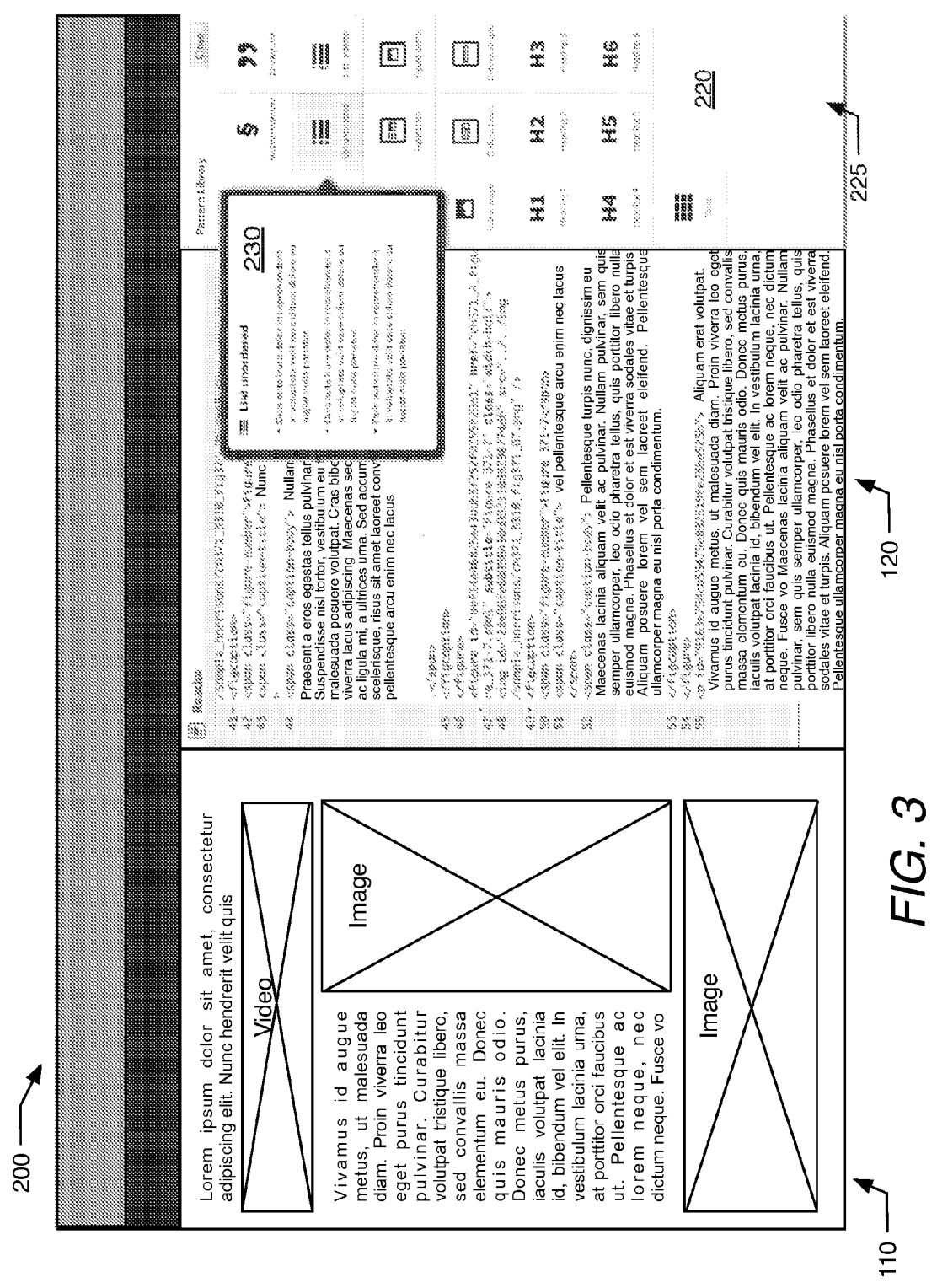

In FIG. 2, a pattern library button 210 has been added to the interface. Selecting the button will result in the display of the pattern library 220 in a pattern library panel 225, as shown in FIG. 3. The pattern library 220 is a list of patterns, each illustrated by a graphical element, available to the user. Each pattern defines a markup language object that may or may not have user-specifiable configuration options. For example, images may be full- or half-width, lists may be indexed numerically or alphabetically, etc. Some (or all) of the markup language objects may include semantic metadata describing respective content included within the objects in terms of its substance rather than its form or appearance. The patterns are thus customizable snippets of HTML/CSS code, useful for quickly defining portions of a digital content work. Examples of patterns include sections, section side notes, block quotes, paragraphs, headings (of various rank), tables, lists (ordered and unordered), figure placeholders (with various sizings and text flows), image placeholders, callout boxes, etc. The list of available patterns may also be configurable to allow expert users on a team to define patterns for other team members in a custom fashion. Of course, the particular pattern library provided to a user may depend upon the digital content work being edited or created and/or the user's permissions and preferences.

With the pattern library panel 225 open, a user may explore the pattern library by hovering a cursor over an individual pattern library element. In response, a popup window 230 is displayed. Included within the popup window is an explanation of the corresponding pattern library element.

As shown in FIG. 4, when the user selects a pattern library element 240, the user's cursor 250 changes so that it is represented by an icon, such as a circle with a plus sign element included therein. Next to the cursor is an icon reminiscent of the selected pattern library element. In the illustrated example, the user has selected an unordered list element from the pattern library, hence, the cursor is now represented as a green circle with a plus sign therein and adjacent to the cursor is provided an icon representing an unordered list element. The selected pattern library element can be placed into the digital content work by positioning the cursor at the desired location within the presentation pane 110 and clicking. Alternatively, a user could position the cursor within the source code of the digital content work displayed in the code pane 120 and perform the insertion action. In either instance, the portion of the digital content work 260, 270 below which the new pattern library element will be inserted is highlighted so that the user can properly locate the insertion point. In other embodiments, the pattern library element may be inserted above the highlighted block. In still further embodiments, drag and drop operations may be supported and the user may simply select a pattern library element from the pattern library pane and drag and drop it into position within the other content of the digital content work.

After insertion, the added pattern library element may remain highlighted for a time in order to provide the user visual confirmation that the addition of the pattern library element has been completed and the element is in the desired location. If the element needs to be moved to a different location it can be selected (in either the presentation pane or the code pane) and dragged to the new location.

If the user has selected the wrong pattern library element from the pattern library, clicking again on the pattern library element icon in the pattern library pane will deselect it. Further, if multiple instances of a particular pattern library element are to be inserted, the user may double-click the desired pattern library element icon in the pattern library pane and continue to insert instances of such an element into the digital content work in the fashion described above until the pattern library element is deselected.

Figure 5:
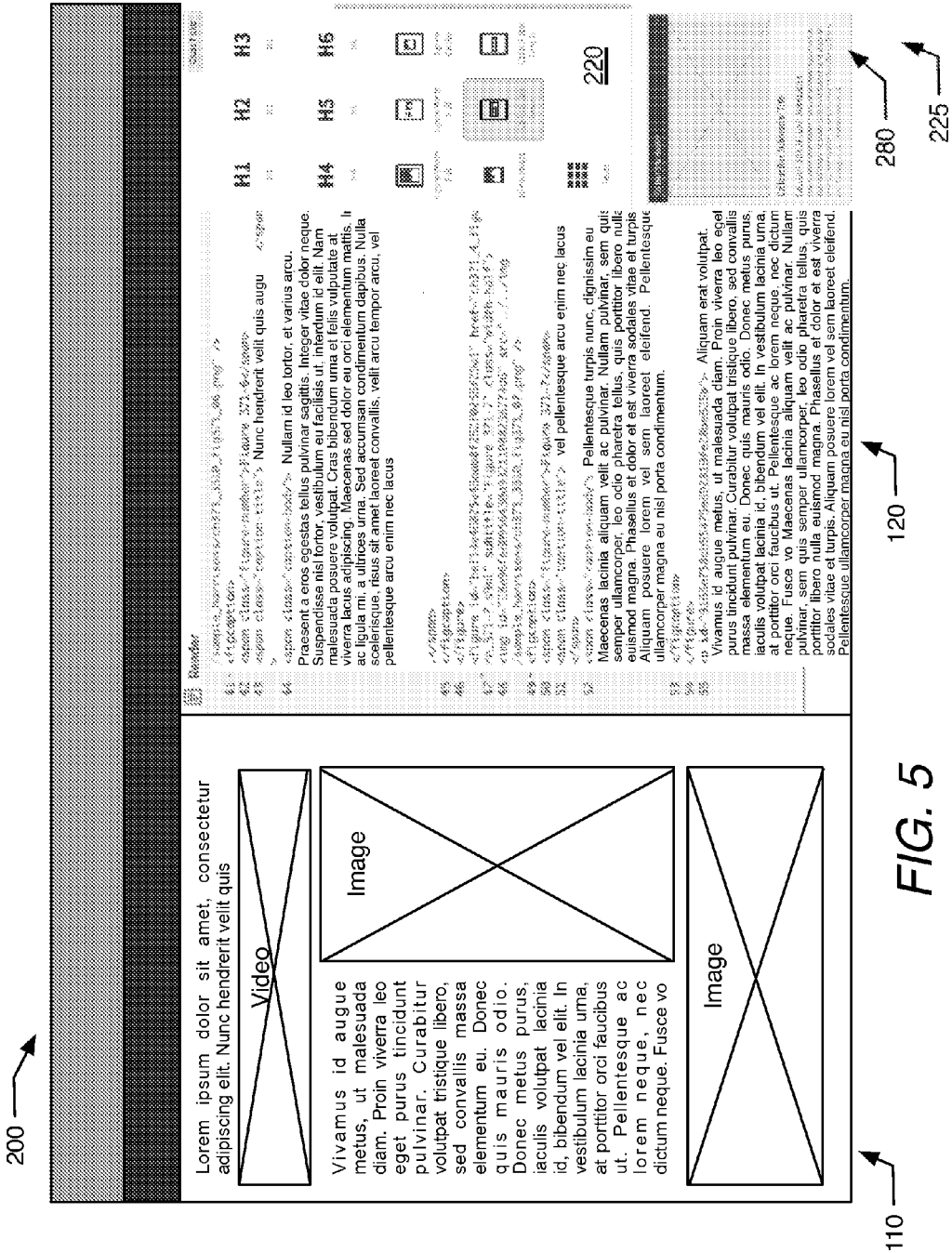
FIG. 5, illustrates an example of the display of a selected pattern library element within the pattern library pane of the editing interface, in accordance with an embodiment of the present invention.

For some users, the iconic representation of the pattern library element and/or the brief explanation thereof provided in a popup window may not be sufficient to fully convey the nature of a particular pattern library element. So, selecting a pattern library element may, in some embodiments, result in the display of an example of such an element within the pattern library pane, as shown in FIG. 5. In the illustrated example, the user has selected an icon corresponding to a callout box pattern library element and an example of such a callout box 280 is displayed. The example is complete with all of the attributes of the pattern library element, including a header, a reserved portion for the content to be included in the callout box, one or more captions therefor, and placeholders (e.g., Lorem Ipsum text) for text to describe the material to be included in the callout box. Other pattern library elements have similar examples of their form, function and appearance available for display as part of the pattern library.

The present invention thus allows for insertion of predefined media objects within digital content works. By using the predefined media objects, commonality of the code describing the media objects is preserved across the digital content work. By precluding direct editing of the library elements within the presentation pane, this good coding practice is preserved. The modality provided by the present invention is one of WYSIWYM (what you see is what you mean) rather than WYSIWYG (what you see is what you get). That is, by providing the user only limited creative exploitation of the pattern library elements, the present invention ensures that uniformity of coding practices are preserved across the entire digital content work.

Digital content works such as those described herein may contain one or more text, graphic, audio, visual, and/or audiovisual elements. In some examples, the digital content works may comprise one or more electronic textbooks, electronic pamphlets, electronic workbooks, electronic documents, e-books, and the like. Digital content works may be stored according to any number of or combination of electronic formats including markup language files (e.g., extensible markup language (XML), hypertext markup language (HTML), etc.) Portable Document Format (PDF), ePub (electronic publication—a free and open e-book standard by the International Digital Publishing Forum), Cascading Style Sheets (CSS), and the like), graphics interchange format (GIF), portable network graphics (PNG), joint photographic experts group format (JPEG), exchangeable image file format (EXIF), tagged image file format (TIFF), raw format, bitmap (bmp), scalable vector graphics (SVG), postscript (PS), portable document format (PDF), shockwave flash (SWF), Waveform Audio File Format (WAV) format, Motion Picture Experts Group (MPEG) I, II, III, IV, Apple lossless (m4a), and the like. A digital content work may be one or more pieces, or "portions" of digital content work that may be organized into a coherent whole. The term digital content work may thus be used to refer to both a portion of a digital content work or the entire digital content work.

In some embodiments, systems configured in accordance with the present invention includes a content creation module that provides content contributors a set of content viewing and editing tools to create a digital content work. These content viewing and editing tools may include tools configured to provide representations of the digital content work to facilitate the content creation and editing operations described herein. The system may also include a publication module for producing a plurality of target platform-dependent representations of the digital content work from a target platform-independent representation of the digital content work. Each target platform-dependent representation may be for display on a respective one of the plurality of target devices or media. To facilitate such publication, the publication module may be provided profiles for each target device or medium, said profiles specifying capabilities of the respective target device or medium. The target platform-dependent representations of the digital content work are created so as to be compliant with profile-specified capabilities of the respective target device or medium. In some instances, the publication process includes altering the behavior or appearance of media objects, changing the layout of the text (e.g., based upon available screen resolution of the target device), selecting or reformatting images, video or audio to work with the target device, etc.

Figure 6:
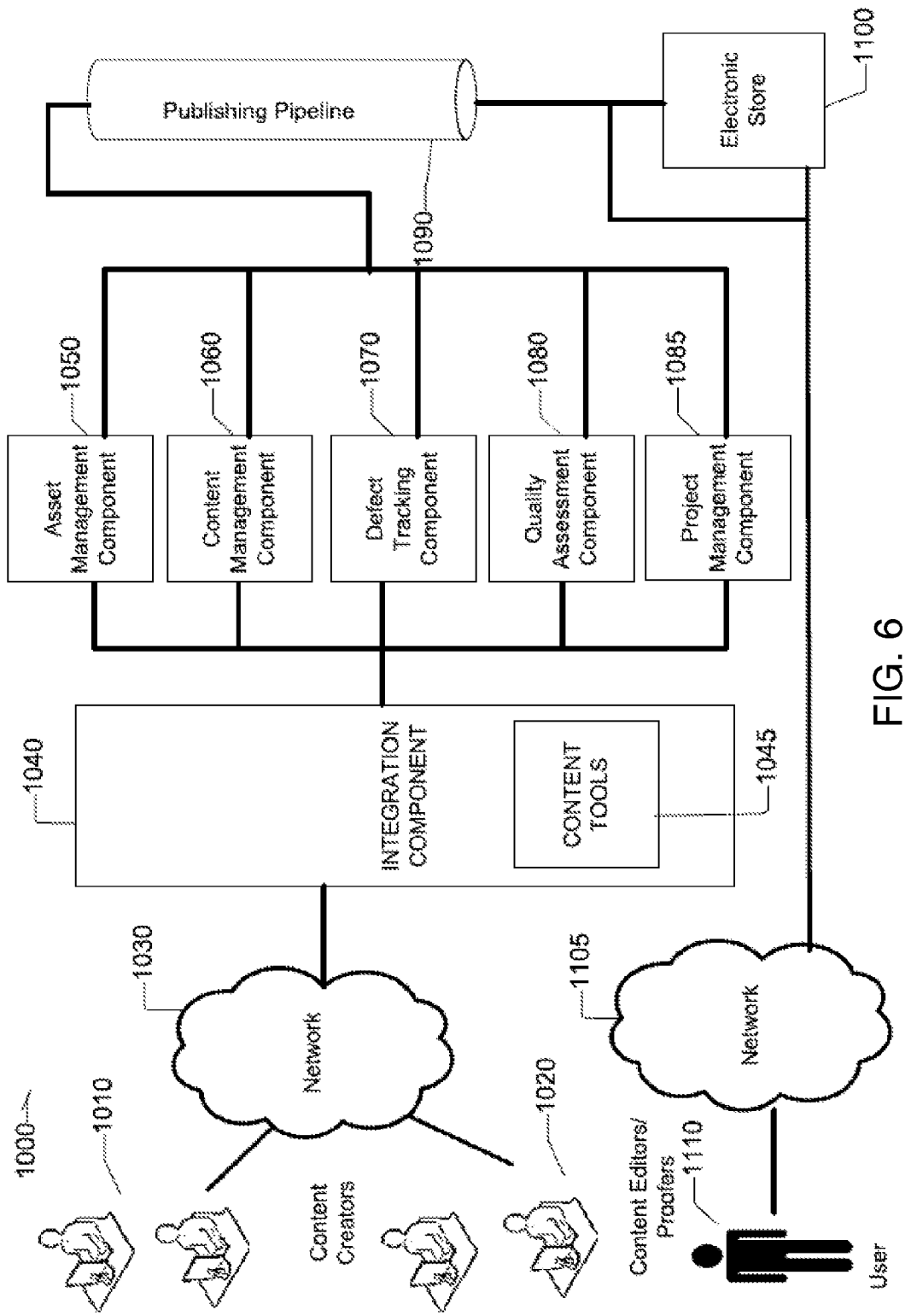
FIG. 6 illustrates an example of a content creation and editing tool, which includes user interface tools such as those described with reference to FIGS. 2-5.

FIG. 6 illustrates an example of a content creation and editing tool 1000, which may include user interface tools such as those described above. The various components of the system 1000 may be connected to each other directly or through a network. For example, one or more content creators 1010 and one or more content editors 1020 or other contributors may utilize computing devices to interface with the system 1000 through network 1030. Network 1030 may include any electronic network that allows content creators 1010 and content editors 1020 to access the components of the system 1000. For example, one or more portions of network 1030, or network 1105 (which may be the same or different network as network 1030) may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another type of network, or a combination of two or more such networks, or the like. While certain components of FIG. 6 may be shown as directly connected, they may also be connected through a network, such as a network similar to networks 1030 and 1105. For example, asset management component 1050, content management component 1060, defect tracking component 1070, quality assessment component 1080, project management component 1085, publishing pipeline 1090, electronic store 1100, and integration component 1040 may be connected directly, through a network, or through a combination of direct or network connections. Furthermore, while each component is logically separated from the other components for convenient description, it should be recognized that some or all of the functionality of one component might be performed by a different component.

Integration component 1040 may be a network-addressable component, which may provide a user interface that allows contributors, including content creators 1010 and content editors 1020, to interface with the rest of the system. In some examples, the interface may be a graphical user interface (GUI) that may allow content editors 1020 or other contributors to view, edit, and manage various portions of electronic content in the manners described above, e.g., using content tools 1045. Thus, content tools 1045 may include editing interfaces in which the content displayed on the screen includes preview images captured so that the cards, which the previews represent, appear in a form closely corresponding to their appearance in the target rendering environment, and according to user-specified criteria. Integration component 1040 may also facilitate communication between other various components of the system 1000. For example, integration component 1040 may direct one or more of the other components to take some action, communicate with another component, relay information between components, or the like.

In one example, integration component 1040 may be located on one or more computer systems accessible by content creators 1010 and content editors 1020 through network 1030. In yet other examples, integration component 1040 may be locally executable on computer terminals of contributors such as content creators 1010 and editors 1020 and may utilize network 1030 to access the other components of the system 1000. In yet other examples, integration component 1040 may include components executable on both the computer terminals of content creators 1010 and editors 1020 as well as pieces accessible and executing on a remote server accessible over network 1030.

In some examples, integration component 1040 may interface with asset management component 1050 in order to facilitate the presentation of the electronic content work from a number of content portions. Content portions may be any audio, visual, audiovisual, text, or other content that is intended to be merged with other content portions into an electronic content work. Content portions may also be referred to as "assets." Asset management component 1050 may be a network-addressable component, which, in conjunction with integration component 1040, may allow for the management of the content creation process by managing the submission, modification, and integration of various component portions of the electronic content. This creation management process may include indexing and tracking submitted components, identifying missing content, assigning sections of missing content to one or more contributors, and managing the integration of submitted content into a complete or nearly complete version of the electronic content work. In some examples, the asset management component 1050 may implement version tracking to track changes made to the component content portions.

Once the contributors are satisfied with the draft of the electronic work, the work may be submitted to the content management component 1060. In some examples, defect tracking through the defect-tracking component 1070 may also begin. Integration component 1040 may then coordinate the delivery of the content from the asset management component 1050 to the content management component 1060 (if necessary), coordinate starting of the version control of the work as a whole (in some examples, versions may be managed on the content portions and the work as a whole simultaneously), and coordinate starting the defect tracking process. Editors 1020 or other contributors may then begin editing the electronic content, for example using the user interface tools described above.

Defect tracking component 1070 may be a network-addressable component, which, in conjunction with integration component 1040, may include tools, which allow users to open defects, track defects, fix defects, and close defects found in electronic content. For example, an editor may be reviewing the content through content tools 1045 and may open defects by selecting or otherwise indicating the defect in the content itself and entering information about what is defective. Content tools 1045 may then pass this information to the defect-tracking component, which may open a defect. In other examples, defects may be opened by the quality assessment (QA) component 1080 as a result of automatic content checks performed by the quality assessment component 1080. The QA component may send a message to the defect-tracking component 1070 with information on the defect, and the defect-tracking component 1070 may open the defect.

In some examples, user access control may be implemented through various permission-based rules. In one example, users (e.g., contributors) may belong to one or more groups of users and content may be organized into one or more groups. User groups may be given access to one or more content groups. Each user group may have one or more users, and each content group may have one or more content portions. In other examples, each user is individually given access to various portions of content or groups of portions of content. A user or group of users may be granted read, write, delete, or other access types to a portion of the content or a content group.

In some examples, integration component 1040 also includes a device simulator, which may provide the previews described herein. Since the electronic content may be targeted to multiple and disparate electronic device platforms, and since the content may not be rendered identically across disparate electronic device platforms, integration component 1040 may include a device simulator which allows the contributor to build the content locally (or allows integration component 1040 to interface with the publishing pipeline 1090 to build the content) for the particular desired target electronic device and through an emulator running in the system preview how the content will look and react to input and other stimuli. The emulator emulates the environment of the target electronic device so the contributor will have an accurate representation of how the electronic content performs on the target electronic device.

Project management component 1085 may be a network-addressable component and may integrate with integration component 1040 or other components of system 1000 to control and store data related to project management of one or more electronic works. Once the content is ready for publication, one or more of the contributors may publish the electronic content work. Publication (or "building" the content) is a process by which a format independent representation of the content is transformed into a format dependent representation of the content. For example, the content may be customized for a particular client device (e.g., an iPAD). This process may be done through the integration component 1040, and the publishing pipeline 1090 may build content. Once the electronic content has been built by the publishing pipeline 1090, the publishing pipeline may distribute the published content, for example by interfacing with the electronic store 1100, which may then make the content available for download by an end-user 1110 on an electronic device over a network 1105.

The various operations of example methods described herein may be performed, at least partially, by one or more processors that are temporarily configured (e.g., by software) or permanently configured to perform the relevant operations. An example of a processor based system suitable for such configuration and operation is shown in FIG. 6. In other examples, however, the methods described herein may be at least partially performed by processors deployed across a number of machines, e.g., in a "cloud computing" environment or as "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Figure 7:
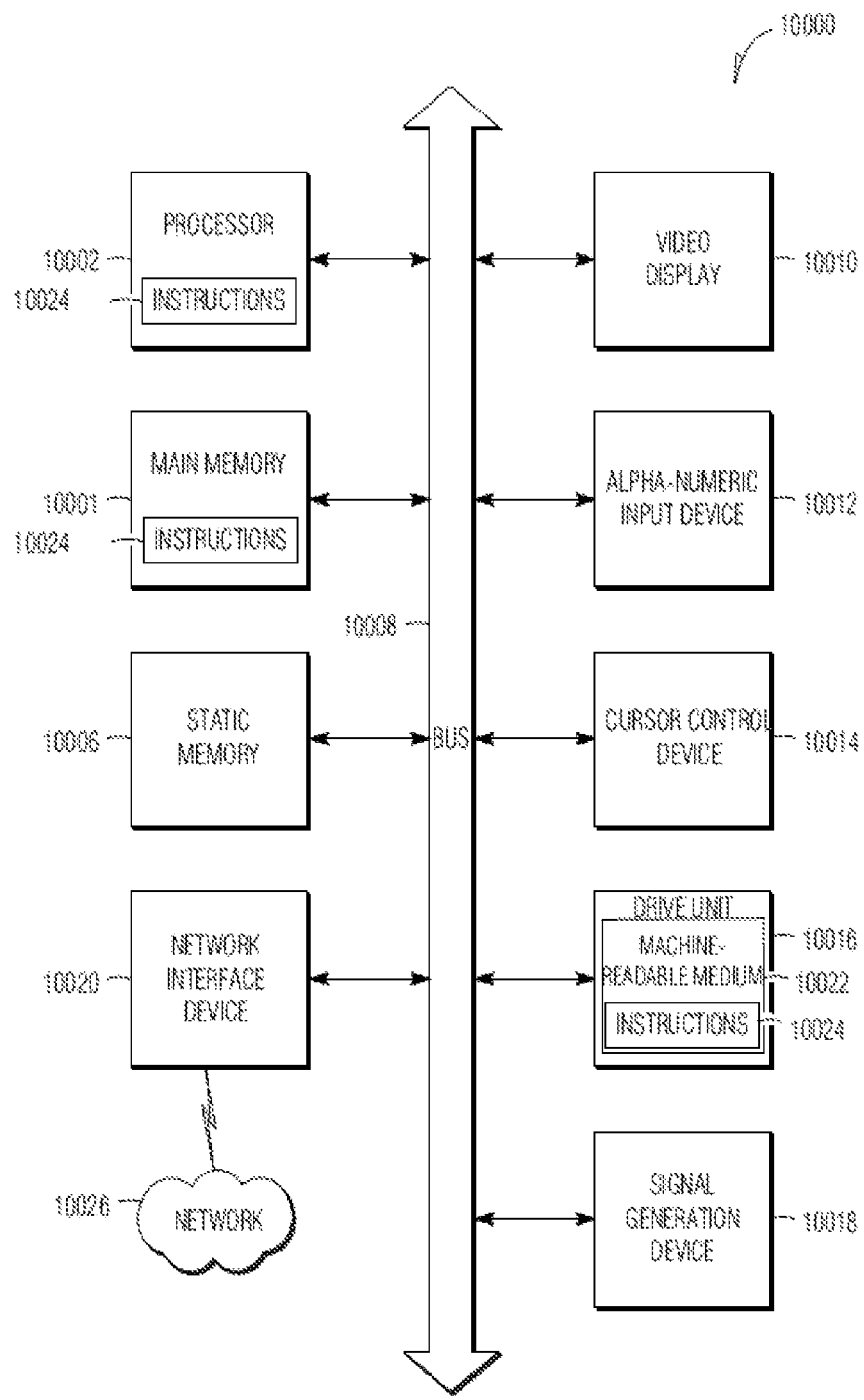
FIG. 7 illustrates an example of a computer system within which a set of instructions for causing a processor to perform the methods, processes, operations, or methodologies of embodiments of the present invention may be stored and operate.

Computer system 10000, shown in FIG. 7, within which a set of instructions for causing the machine to perform any one or more of the methods, processes, operations, or methodologies discussed herein may operate as a stand-alone device or may be connected (e.g., networked) to other machines. In a networked deployment, the machine may operate in the capacity of a server or a client machine in server-client network environment, or as a peer machine in a peer-to-peer (or distributed) network environment. Various instantiations of computer system 10000 may be servers or clients.

The example computer system 10000 includes a processor 10002 (e.g., a Central Processing Unit (CPU), a Graphics Processing Unit (GPU) or both), a main memory 10001 and a static memory 10006, which communicate with each other via a bus 10008. The computer system 10000 may further include a video display unit 10010 (e.g., a Liquid Crystal Display (LCD) or a Cathode Ray Tube (CRT)). The computer system 10000 also includes an alphanumeric input device 10012 (e.g., a keyboard), a User Interface (UI) cursor controller 10014 (e.g., a mouse), a disk drive unit 10016, a signal generation device 10018 (e.g., a speaker) and a network interface device 10020 (e.g., a transmitter).

The disk drive unit 10016 includes a machine-readable medium 10022 on which is stored one or more sets of instructions 10024 and data structures (e.g., software) embodying or used by any one or more of the methodologies or functions illustrated herein. The software may also reside, completely or at least partially, within the main memory 10001 and/or within the processor 10002 during execution thereof by the computer system 10000, the main memory 10001 and the processor 10002 also constituting machine-readable media.

The instructions 10024 may further be transmitted or received over a network 10026 via the network interface device 10020 using any one of a number of well-known transfer protocols (e.g., HTTP, Session Initiation Protocol (SIP)).

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any of the one or more of the methodologies illustrated herein. The term "machine-readable medium" shall accordingly be taken to include, but not be limited to, solid-state memories, and optical and magnetic medium.

Method embodiments illustrated herein may be computer-implemented. Some embodiments may include computer-readable media encoded with a computer program (e.g., software), which includes instructions operable to cause an electronic device to perform methods of various embodiments. A software implementation (or computer-implemented method) may include microcode, assembly language code, or a higher-level language code, which further may include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, Random Access Memories (RAMs), Read Only Memories (ROMs), and the like.

Thus, systems and methods for creating and editing digital content works have been described.

What is claimed is:

1. A computer-implemented method, comprising:
    displaying, responsive to user-input and in a graphical user interface of a computer-based content creation and editing tool:
        a presentation view of content comprising the digital content work;
        a code view of the content comprising the digital content work displayed in the presentation view, such that the digital content work is displayed in the presentation view in a form closely corresponding to its appearance in a target rendering environment and the code view permits direct editing of source code of the digital content work displayed in the presentation view and the presentation view and the code view are concurrently displayed; and
        a plurality of icons representing a library of predefined media objects for insertion in the portion of the digital content work open for editing within the presentation view and code view of the content creation and editing tool; and
    in response to selection of an element within the content in the presentation view, a cursor is positioned at the location of the source code for the selected element in the code view,
    wherein the digital content work comprises a collection of media cards, and one or more of the predefined media objects each comprise a user-customizable markup language object for defining portions of the digital content work;
    responsive to a user action specifying a desire to insert computer-readable code corresponding to a selected one of the library of predefined media objects into the digital content work at a user-specified location in the presentation view, highlighting the portion of the of the digital content work adjacent to the user-specified location in the presentation view, and
    inserting the code for the selected media object into the source code of the digital content work at a source-code location corresponding to the user-specified location in the presentation view.

2. The method of claim 1, wherein the user action comprises a cursor control action initiated when a cursor is positioned at the user-specified location in the presentation view of the digital content work.

3. The method of claim 1, further comprising displaying an explanation of a selected one of the media objects of the library responsive to a user action positioning a cursor to indicate a respective one of the icons of the library.

4. The method of claim 3, wherein the explanation is presented in a popup window or a panel.

5. The method of claim 4 wherein the explanation comprises an example of the selected media object.

6. A computer-implemented method for providing a content-creation and editing tool, comprising:
    opening and presenting a digital content work comprising a collection of media cards in a content-creation and editing user interface, wherein presenting the digital content work comprises:
        displaying a presentation view of the digital content work in a first panel of the user interface, wherein the digital content work is displayed in the first panel in a form closely corresponding to its appearance in a target rendering environment;
        displaying a code view of the digital content work in a second panel of the user interface, wherein the digital content work is displayed in the second panel as source code to permit direct editing of the source code of the digital content work displayed in the presentation view; and
        displaying a library of selectable pre-defined media objects comprising a markup language object for defining portions of the digital content work for insertion into the digital content work by user cursor action of dragging and dropping a selected one of the pre-defined media objects into either of the presentation view or the code view and the first panel and the second panel are concurrently displayed; and
    in response to selection of an element within the content in the first panel, a cursor is positioned at the location of the source code for the selected element within the source code in the second panel;
    responsive to a user action specifying a desire to insert computer-readable code corresponding to a selected one of the library of predefined media objects into the digital content work at a user-specified location in the presentation view, highlighting the portion of the of the digital content work adjacent to the user-specified location in the presentation view, and
    inserting the code for the selected media object into the source code of the digital content work at a source-code location corresponding to the user-specified location in the presentation view.

7. A computer-implemented method for providing a content-creation and editing tool, comprising:
    opening and presenting a digital content work comprising a collection of media cards in a content-creation and editing user interface, wherein presenting the digital content work comprises:

displaying a presentation view of the digital content work in a first panel of the user interface, wherein the digital content work is displayed in the first panel in a form closely corresponding to its appearance in a target rendering environment;

displaying a code view of the digital content work in a second panel of the user interface, wherein the digital content work is displayed in the second panel as source code to permit direct editing of the source code of the digital content work displayed in the presentation view; and displaying a library of selectable pre-defined media objects comprising a markup language object for defining portions of the digital content work for insertion into the digital content work by user cursor action of dragging and dropping a selected one of the pre-defined media objects into either of the presentation view, wherein one or more of the markup language objects are user-customizable;

responsive to a user action specifying a desire to insert computer-readable code corresponding to a selected one of the library of predefined media objects into the digital content work at a user-specified location in the presentation view, highlighting the portion of the digital content work adjacent to the user-specified location in the presentation view, and inserting the code for the selected media object into the source code of the digital content work at a source-code location corresponding to the user-specified location in the presentation view.

8. The method of claim 7, wherein one or more of the markup language objects include semantic metadata describing respective content included within a respective object in terms of the respective object's substance rather than its form or appearance.

9. The method of claim 7, wherein the markup language objects include one or more of: sections, section side notes, block quotes, paragraphs, headings (of various rank), tables, lists (ordered and unordered), figure placeholders (with various sizings and text flows), image placeholders, and callout boxes.

10. The method of claim 7, further comprising displaying a popup window including an explanation of a corresponding element of the library in response to a cursor hover over the corresponding library element.

11. The method of claim 7, further comprising displaying a cursor as an icon corresponding to a selected one of the library elements upon user selection of the corresponding library element.

12. The method of claim 7, further comprising displaying, next to a cursor, an icon reminiscent of a selected one of the library elements upon user selection of the corresponding library element.

13. The method of claim 7, work below which a selected library element will be inserted is highlighted in both the code view and the presentation view to permit user location of an insertion point.

14. The method of claim 13, wherein after insertion of one of the library elements in the digital content work represented in the code view or the presentation view, the library element remains highlighted in the code view and the presentation view for a period of time in order to provide the user visual confirmation that addition of the library element has been completed.

15. The method of claim 7, further comprising permitting dragging of an inserted library element to a location other than an original insertion location of the library element in either the presentation view or the code view.

16. The method of claim 7, further comprising displaying an example of a selected library element within the third panel upon user selection of the library element.

17. The method of claim 7, further comprising concurrently displaying the first and second panel and a third panel, wherein the library is displayed in the third panel.

18. The method of claim 7, wherein one or more of the markup language objects have user-specifiable configuration options.

\* \* \* \* \*